United States Patent Office 2,922,618
Patented Jan. 26, 1960

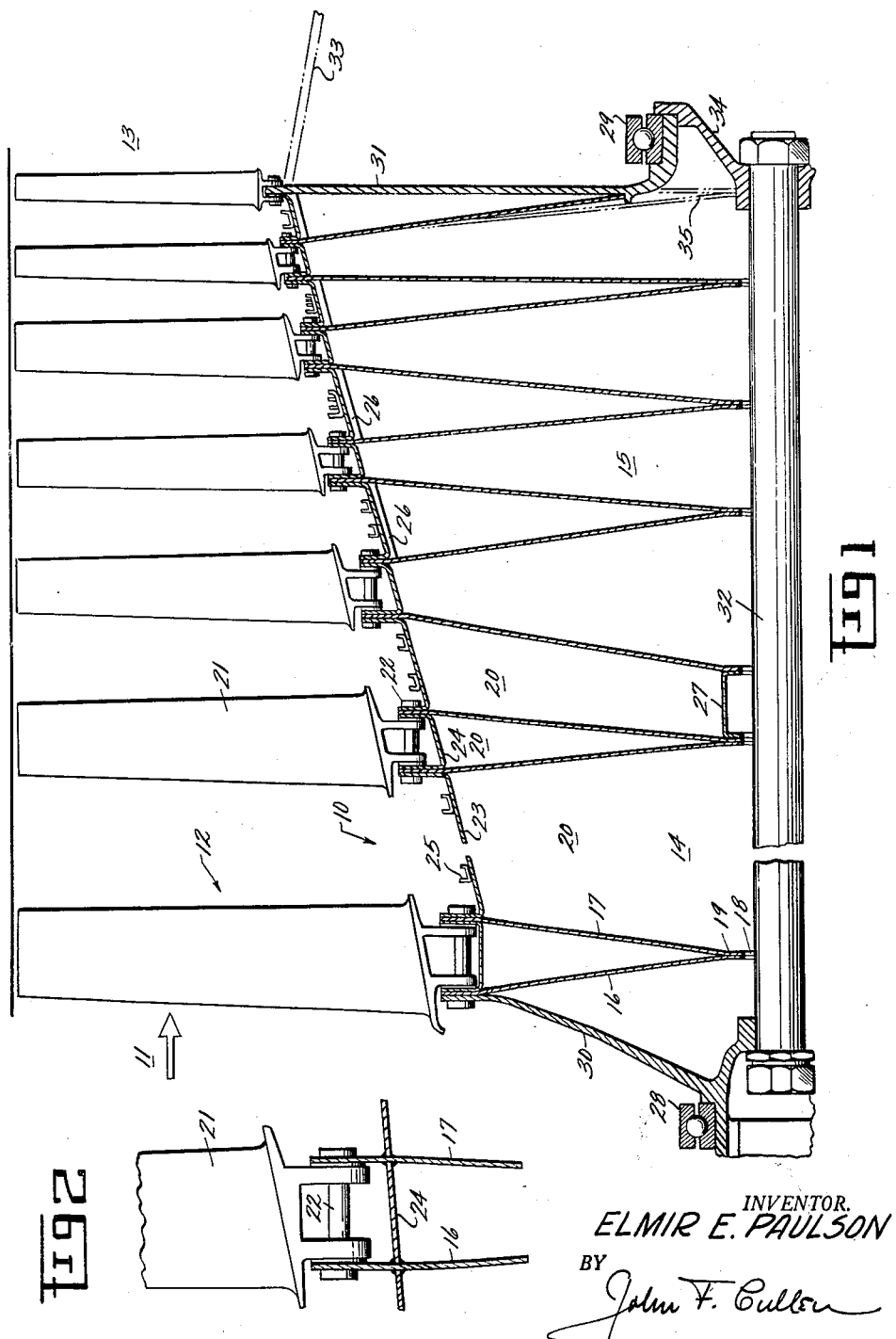

2,922,618

TURBO-MACHINE ROTOR

Elmir Edward Paulson, Madeira, Ohio, assignor to General Electric Company, a corporation of New York Application March 6, 1956, Serial No. 569,770

9 Claims. (Cl. 253—39)

The present invention relates to a rotor structure and, more particularly, to a turbo-machine rotor such as may be used on compressors and turbines and which is of lightweight construction, but capable of withstanding the loads and stresses normally encountered by such rotors when they are used in gas turbine powerplants.

Because of the nature of its use, one of the major objectives of rotors for aircraft is lightweight construction. However, the demand for more powerful engines without significant weight increase requires the rotor structure to operate under higher loads, stresses, and temperatures, which presents a problem in designing structure that is able to operate under more exacting requirements and still maintain, or even reduce, the structural weight. Generally speaking a turbo-machine rotor for aircraft usage is subjected to large centrifugal loads, gyroscopic loads, torsional loads, and loads due to temperature differences between the parts. One answer to these demands, in compressor construction, has been the lightweight or drum type compressor which is generally a hollow rotor that may or may not employ an internal shaft and usually has the wheel structure composed of discs or the like for lightweight construction. The difficulty with such constructions has been their inability to carry bending loads satisfactorily. Consequently, the parts are heavier than desired. For example, some prior constructions have required a substantial central shaft member in insure rigidity of the rotor. Those rotor constructions which have dispensed with the central shaft have required the use of relatively heavy discs or a disc arrangement wherein the bending loads results in high stresses in and around the blade base. Furthermore, to prevent flutter or vibration the drum type rotors have required the use of the aforementioned central shaft arrangement or heavy disc arrangement. The present invention relates to a drum type rotor construction employing discs which overcome the above objections and is lightweight in construction.

The principal object of the present invention is to provide a lightweight rotor construction that employs a novel disc arrangement to provide for a stable rotor able to accommodate the centrifugal and gyroscopic loads and those loads due to temperature differences.

Another object of the invention is to provide a rotor that employs thin sheet metal discs and avoids the problem of disc vibrations normally encountered with such use.

A further object is to provide a rotor that permits the use of the torque members at the maximum diameter to provide for the minimum weight and maximum stiffness.

Briefly stated, the invented rotor construction comprises a hollow or drum arrangement internally supported by a series of spaced coaxial discs which are cone shaped. Adjacent discs are secured together substantially at their centers and flare radially outwardly to the rotor periphery to provide a series of spaced portions on the pheriphery. Blade means are carried in the suitable spaced portions on the periphery of the rotor. The disc arrangement provides a triangular stable construction and the torque tube members are connected between the discs and the blades at the periphery of the rotor to act as the main load carrying members and tie the rotor together. The construction permits the omission of the central shaft, if desired, and provides a relatively large base to take the blade bending loads.

My invention will be better understood from the following description taken in connection with the accompanying drawing and its scope will be pointed out in the appended claims.

For a better understanding of my invention, reference may be had to the accompanying drawing, in which:

Figure 1 is a partial cross sectional view, with the size of some parts exaggerated, of a turbo-machine rotor, such as a compressor constructed in accordance with the present invention; and Figure 2 is a partial cross section view of a modified construction of the torque tube.

The invention will be described as applied to a compressor rotor although it is to be understood that the invention is equally applicable to a single or multi-stage turbine rotor whether for aircraft or non-aircraft use. Referring now to Figure 1 of the drawing, there is shown a compressor generally indicated at 10, which is adapted to receive air to be compressed at inlet end 11 as shown by the arrow, compress it through the blading generally indicated at 12, and exhaust it at 13 to a suitable point of use such as a combustor section. It may be seen that the instant compressor is divided into two sections which, for convenience, may be termed the low pressure section 14 and the high pressure section 15. These sections may be determined by the change in the disc arrangement as will be described. It should be appreciated that the "sections" are merely terms of convenience for description inasmuch as the pressure gradient across such a compressor is not clearly divisible into a low and a high pressure section. The "sections" as used herein are intended to provide a line of separation between different disc arrangements which line may change depending upon the diameter of and loads imposed upon the compressor as will be apparent as the description proceeds.

Each rotor stage comprises a pair of conical discs 16 and 17 having a central unsupported opening 18 therein. By unsupported is meant shaftless or, in other words, the central opening 18 is, as shown in Figure 1, free of contact with supporting members such as shafts, hubs or the like. The discs are coaxial and are arranged in a butting relation at their central portion so that they flare radially outwardly as shown. The pair of discs 16 and 17 may have a tangential surface 19 in a butting relation at the rim of opening 18. The discs are secured together at 19 by any suitable means, such as welding. The tangential surface 19 merely provides a convenient means of securement and the discs may be secured at the rim of opening 18 in any equivalent manner. The discs, as shown, are preferably thin sheet metal discs of constant cross section. Thus, the discs may be quite simply stamped and coned by a simple operation. It is important to note that the discs are shown greatly exaggerated in size for clarity and the actual thickness of some of the discs is extremely small and approaches the thickness of an average sheet of paper. Thus "thin" means in the nature of about ten to one hundred thousandths of an inch.

The radial outward flare of the discs provides spaced portions 20 between the discs at the periphery of the rotor. A series of such disc arrangements may be carried out the full length of the rotor. However, if the rotor diameter increases above certain limits which depend upon the conditions under which it must operate, it may be desirable to change the disc arrangement at the larger diameter portion of the rotor and this changed portion has been designated for convenience the "high pressure section 15." It can be seen that the angle between the discs at the periphery and the transverse plane tangent to the discs at the periphery becomes smaller as the radius increases. Thus, it is desirable to change the disc arrangement to maintain this angle as the radius increases. In other words, as the radius increases, the discs tend to approach a straight line which is undesirable in the instant invention, the cone shape being essential.

In the low pressure section 14, the rotor blades 21 may be carried between the secured discs 16 and 17. As shown, blade 21 may be secured by a pinned connection 22 to the extremities of the discs. This arrangement permits the blades 21 to rotate relative to the discs in the direction of disc rotation. During operation of the rotor, the blades take their position by the combination of gas load and centrifugal force. Thus, the root bending moment is avoided.

To provide for the transmission of torque, suitable torque means such as torque tube means 23 which approximate the disc thickness, may be secured to the discs in any suitable manner as by the flanges shown in Figure 1 or by welding as shown by Figure 2. Similar torque means 24 are provided between the discs 16 and 17 to maintain the spacing therebetween and transmit the torque.

The arrangement thus far described provides a relatively wide base, and the outer peripheral shell of the rotor, as defined by members 23 and 24, is the bending load carrying member. Preferably, the middle plane between the flaring discs passes through the center of spaced portion 20 and the point of securement of the discs at 19. This is not essential as may be seen hereinafter in a discussion of the high pressure section. Suitable interstage sealing means 25 may be provided on the outer surface of torque means 23 for cooperation with conventional stator sealing means not shown.

Thus far described, it should be apparent that gyroscopic loads which tend to rock the blades back and forth are spread out along the base of the blade and are transmitted to the shell as defined by torque means 23. Thus, no bending stresses are present in the discs, and they are designed merely to take the centrifugal or tension load of the blades whereas the shell carries the bending load. The rigid structural arrangement is shown by the triangular configuration formed by discs 16, 17, and torque connecting means 24. Since this structure forms a triangle, the inner portion at central opening 18 is not subject to flutter or vibration under operation. As a consequence, the discs are loaded only in tension. To provide for lightweight construction, the location of the torque means 23 at substantially the outer periphery of the discs is permitted by the instant invention.

The vibration problem, that would be normally encountered in the thin disc construction shown, is eliminated by the cone arrangement of the discs which arrangement permits the discs to maintain their strength and stiffness over less desirable constructions, such as ribbing the discs which would reduce their strength and stiffness. The cone and triangular arrangement is more resistant to loads in all directions.

As the diameter of the rotor increases, the torque means is, of course, subjected to higher hoop stresses. This may occur in the high pressure section 15. Accordingly, it may be necessary to provide stiffening means 26 to torque means 23 in this section. The stiffening means 26 may conveniently be longitudinal ribs secured to the inner surface of the torque means. Stiffening means or fins 26 actually lower the hoop stress but raise the allowable peripheral speed of torque means 23.

As can be seen from the drawing, the disc arrangement in the high pressure end is reversed from that in the low pressure end in order to maintain the angular relationship between the discs and the transverse plane tangent to the discs at their periphery, as described above. In other words, the cone disc is still provided. Thus, the blades are mounted in the spaced portions adjacent the spaced portions subtended by the flaring discs. Suitable connecting means 27 join the adjacent discs between the high pressure and low pressure sections preferable at the radially inner end of the discs around the central opening. If the rotor diameter does not require this construction, the construction shown for the low pressure section 14 is continued to the end of the rotor and vice versa.

In order to provide for rotation about a central axis, bearing means 28 and 29 are provided at each end of the rotor structure. The rotor is carried on the bearings by end members 30 and 31, member 31 preferably being flexible to permit expansion under temperature changes.

The structure illustrated is a satisfactory three bearing arrangement having bearings 28 and 29 as shown, and a third bearing, not shown, at the turbine end of the powerplant when used in a gas turbine powerplant. Due to the unbalanced gas load on the rotor structure because of the higher pressure at the downstream end of the compressor rotor, the rotor may tend to shift forwardly at its periphery. This tendency may be countered by a bolt 32, radially spaced from the central opening 18 of the discs which are freely floating at this point, and the bolt is connected to end members 30 and 31. The flexibility of end member 31 also permits the center bearing 29 to be out of line and longitudinal loads are taken by the flexure of member 31.

The structure is slightly modified in a two bearing powerplant wherein bearing 28 is used along wtih a suitable bearing, not shown, at the turbine end of the powerplant when used in a gas turbine powerplant. When a two bearing arrangement is used, the rotor may be tied substantially at its periphery to a downstream portion such as the turbine by dotted member 33. With this construction, the central bearing 29, its guided rotating element 34, and bolt 32 are all omitted. With such arrangement, end member 31 and its associated disc would be extended as shown dotted, and secured at 35 in the same manner as the other adjacent discs. The shifting tendency due to unbalanced gas loads is then counteracted by member 33.

The arrangements described provide a lightweight construction that is relatively stiff and free from shifting in operation. The novel disc arrangement reduces the problem of disc vibrations and provides for tension loading only of the discs, the main loads being carried by the shell structure described. Also, the torque tube means are arranged at the optimum position for lightweight construction. The central openings 18 permit the spaces between the discs to be vented to avoid the buildup of pressure therein.

While a particular embodiment of the invention has been illustrated and described, it will be obvious to those skilled in the art that various changes and modifications may be made without departing from the invention, and it is intended to cover in the appended claims all such changes and modifications that come within the true spirit and scope of the invention.

What I claim as new and desire to secure by Letters Patent is:

1. A turbo-machine rotor comprising a series of coaxial conical thin discs having unsupported openings through the centers thereof, a plurality of adjacent discs of said series of discs being secured together at the rim of said openings, said secured discs flaring radially outwardly to the periphery of said rotor, blade means secured between adjacent discs at the periphery thereof, and torque means connecting said discs between said blades substantially at the periphery of said discs.

2. A turbo-machine rotor comprising a series of coaxial conical thin sheet metal discs having unsupported openings through the center thereof, a plurality of adjacent discs of said series of discs being secured together at the rim of said openings, said secured discs flaring radially outwardly to the periphery of said rotor, blade means pivotally secured between adjacent discs at the periphery thereof for rotation relative to said discs in the direction of disc rotation, and torque means connecting said discs between said blades substantially at the periphery of said discs.

3. A turbo-machine rotor comprising a series of coaxial conical thin sheet metal discs having unsupported openings through the center thereof, a plurality of pairs of adjacent discs of said series of discs being secured together at the rim of said openings, said secured discs flaring radially outwardly from said securement to the periphery of said rotor to provide spaced portions between said discs at said periphery, blade means secured between said discs in alternate spaced portions, and torque means connecting said discs substantially at the periphery thereof in the remaining spaced portions between said blades.

4. A turbo-machine rotor comprising a series of coaxial conical thin sheet metal discs each having a circular unsupported opening through the center thereof and a substantially tangential surface at the rim of said opening, a plurality of pairs of adjacent discs of said series of discs being secured together at the rim of said openings with said tangential surfaces in abutting relation, said secured discs flaring radially outwardly in separating fashion from said securement to the periphery of said rotor to provide spaced portions thereat between said discs, blade means pivotally secured between said discs in alternate spaced portions for rotation relative to said discs in the direction of disc rotation, and torque tube means connecting said discs substantially at the periphery thereof in the remaining spaced portions between said blades.

5. Apparatus as described in claim 4 wherein the plane of securement of said tangential surfaces passes through the mid-point of said spaced portions.

6. A turbo-machine rotor comprising, a series of coaxial conical thin sheet metal discs each having an unsupported opening through the center thereof, a plurality of pairs of adjacent discs of said series of discs being secured together at the rim of said openings, said secured discs flaring radially outwardly in separating fashion from said securement to the periphery of said rotor to provide spaced portions thereat between said discs, said rotor having two sections including a generally low and a high pressure section, blade means secured in the spaced portions between the outwardly flaring discs in the low pressure section, blade means secured in the spaced portions adjacent the spaced portions between the outwardly flaring discs in the high pressure section, torque tube means connecting said discs substantially at the periphery thereof in the spaced portions between said blades, and means interconnecting the adjacent discs between the high and low pressure sections at the rim of their respective central openings.

7. Apparatus as described in claim 6 including bearing means supporting said rotor for rotation therein, and means connecting the periphery of said rotor to said bearings.

8. Apparatus as described in claim 6 including a bolt-like member coaxial with said discs and radially spaced from the rim of said central openings, bearing means supporting said bolt-like means for rotation therein, and means connecting the periphery of said rotor to said bearings for rotation therein.

9. Apparatus as described in claim 4 including a bolt-like member coaxial with said discs and projecting beyond said discs at each end of said series of discs, said bolt-like member being radially spaced from the rim of said disc central openings, bearing means supporting said bolt-like member at each end thereof for rotation therein, and means connecting the periphery of said rotor at each end thereof to said bearings.

References Cited in the file of this patent

UNITED STATES PATENTS

| | | |
|---|---|---|
| 1,166,316 | Bentley | Dec. 28, 1915 |
| 2,461,402 | Whitehead | Feb. 8, 1949 |
| 2,497,151 | Clark et al. | Feb. 14, 1950 |
| 2,530,477 | Ostmar | Nov. 21, 1950 |
| 2,537,739 | Chilton | Jan. 9, 1951 |
| 2,553,442 | Clark et al. | May 15, 1951 |
| 2,611,532 | Ljungstrom | Sept. 23, 1952 |
| 2,639,885 | Ledwith | May 26, 1953 |
| 2,662,685 | Blanc | Dec. 15, 1953 |
| 2,786,625 | Kent et al. | Mar. 26, 1957 |
| 2,801,071 | Thorp | July 30, 1957 |
| 2,803,397 | Gardiner | Aug. 20, 1957 |

FOREIGN PATENTS

| | | |
|---|---|---|
| 510,131 | Canada | Feb. 15, 1955 |
| 724,281 | Great Britain | Feb. 16, 1955 |
| 728,754 | Great Britain | Apr. 27, 1955 |